May 19, 1942.　　　J. H. MILLER　　　2,283,566

THERMAL CONVERTER CIRCUIT

Filed April 8, 1939　　　2 Sheets-Sheet 1

Inventor:
John H. Miller,
By Potter, Prince & Scheffler,
Attorneys.

Patented May 19, 1942

2,283,566

UNITED STATES PATENT OFFICE 2,283,566

THERMAL CONVERTER CIRCUIT

John H. Miller, Short Hills, N. J., assignor to Weston Electrical Instrument Corporation, Newark, N. J., a corporation of New Jersey Application April 8, 1939, Serial No. 266,846

20 Claims. (Cl. 171—95)

This invention relates to thermal converter circuits for producing direct current voltages proportional to the product of two current values.

Thermal converter circuits of the general type contemplated by this invention are particularly adapted for use with alternating current power lines to provide direct current voltages proportional to the power, or the reactive volt-amperes, for energizing indicating, control or recording apparatus. The two current values in such cases are proportional to the line voltage and the line current, and the direct current output voltage of the thermal converter may be impressed across a measuring instrument that is calibrated in watts, kilovolt-amperes or reactive volt-amperes, or across a resistance in the circuit of control or recording apparatus.

Wattmeters have been proposed in which the sum and the difference of two currents, representing proportionately the line current and the potential of a power system, flow in circuits where they produce temperatures proportional to the squares of the circulating currents; and the difference between the two resulting temperatures influences an indicator as a function of the watts in the load circuit, or of the product $EI \cos \theta$.

Thermal wattmeters of this type are described in British patent No. 2948 of 1904, William Du Bois Duddell and in the patent to Paul M. Lincoln, No. 1,156,412, Oct. 12, 1915. Bimetallic spirals, a mass of mercury in a chamber, and thermocouples have been employed as the thermally responsive devices for obtaining significant indications from the temperature difference. The prior thermocouple arrangements have always been rather unwieldy combinations in view of the necessity for a complete insulation of the thermocouples from the heating circuits. The high thermal capacity of such insulated thermocouples made the meters slow in action. Furthermore, the mass of the thermocouples required a high energy consumption, and the output direct current circuit was relatively high in resistance because of the very poor efficiency of conversion of thermal energy to direct current.

Objects of this invention are to provide thermal converter circuits of the type stated that have a shorter time of response and a higher efficiency than was possible with prior designs. An object is to provide a thermal converter for producing, as a rapid and accurate function of the product of two currents, a direct current voltage for use in various indicating, controlling, recording and other systems in use in the power industry. An object is to provide thermal wattmeters and/or control apparatus having novel thermal converter circuits in which the alternating current components flow through and directly heat the thermocouples. An object is to provide thermal converter circuits for use as wattmeters, control and/or recording devices, said circuits including a plurality of thermocouples in a bridge arrangement, conjugate circuit connections to the bridge for introducing current components corresponding respectively to different significant values, and a direct current utilization device connected to points of the bridge or circuits which have the same alternating current potential. More specifically, an object is to provide a thermal wattmeter including a bridge arrangement of thermocouples, current and voltage transformers having center-tapped secondary windings connected as conjugate arms of the thermocouple bridge, and a direct current measuring instrument connected between the center taps of the transformers. A further object is to provide a thermal converter having thermocouples alternating with two center-tapped secondary windings of a current transformer to form a bridge circuit, a potential transformer having a secondary connected to the center taps of the current transformer, and a direct current utilization device connected between the thermocouples. Further objects are to provide apparatus for obtaining the summation of the total power output of a polyphase power system or a plurality of power systems, the apparatus having for each phase or power system a thermal converter circuit including thermocouples in a bridge circuit, and a single direct current circuit that extends through the several thermal converter circuits and is connected to each at points of the same alternating current potential. Another object is to provide quick reading thermal converter circuits for use in totalizing systems. Still further, an object is to provide thermal converter circuits of the types stated in which the input current transformers have cores that saturate at a predetermined overload point to prevent damage to the thermocouples.

These and other objects and advantages of the invention will be apparent from the following specification when taken with the accompanying drawings in which.

Figure 1:
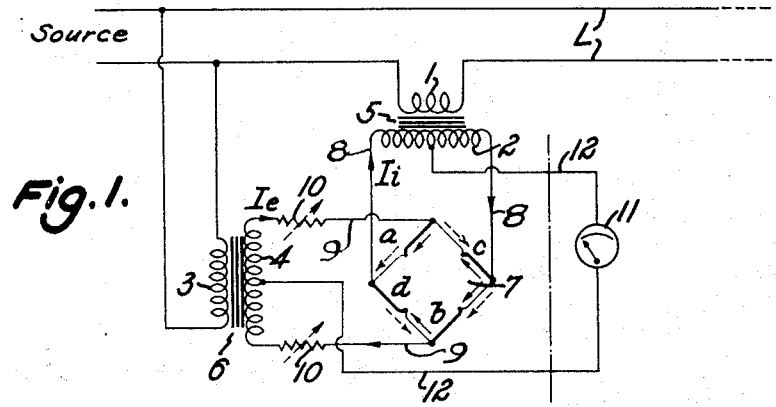
Fig. 1 is a circuit diagram of a wattmeter which includes a thermal converter circuit constituting an embodiment of the invention.

In the circuit of Fig. 1, the reference character L identifies a single phase alternating current line that extends between a source and a load. The primary winding 1 of the current transformer is connected in series in the line in the usual manner, and the secondary winding 2 has a center tap. The primary 3 of the potential transformer is connected across the line, and its secondary 4 is also tapped at the center. The core 5 of the current transformer is designed for complete saturation at about three times normal load, and is preferably a high nickel-iron alloy such as described in the patent to Lewis W. Chubb, No. 1,277,384. The potential transformer may be of the usual design, without provision for saturation, as the potential circuit is almost never overloaded.

Four thermocouples $a$, $b$, $c$, $d$ are welded together in a series circuit, with the thermal junctions similarly arranged, to form a Wheatstone bridge circuit 7. The instrument transformer secondary windings 2, 4 are connected as conjugate arms of the bridge by leads 8, 8 and 9, 9, respectively, and resistors 10 are preferably included in the potential leads 9. A millivoltmeter 11 is connected between the center taps of the transformer secondary windings by leads 12. The heating elements of the thermal converters are the thermocouples per se, and the two input or heating circuits are thus conductively connected to the thermocouples but are effectively isolated from each other and from the direct current output circuit by the bridge circuit arrangement of the thermal converter network.

Figure 1A:
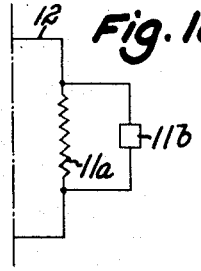
Fig. 1a is a fragmentary circuit diagram showing a generalized application of the Fig. 1 converter circuit for indicating, control or recording.

As shown in the fragmentary circuit diagram, Fig. 1a, the measuring instrument 11 of Fig. 1 may be replaced by a direct current utilization means, i. e. a resistor 11a, across which any desired type of current or voltage-responsive device 11b may be connected. The device 11b may be a measuring instrument calibrated in watts, a recorder for producing a continuous record of the power on the line, or a control or protective system.

The method of operation of the converter circuit may be best understood by assuming that first the potential and then the current circuits to the bridge are opened. The current $I_i$ from the current transformer will divide equally in the two branch paths and flow around the bridge in the direction of the solid line arrows within the bridge arms. When only the potential circuit is excited, the current $I_e$ flows around the bridge in the direction shown by the dotted line arrows. With both input circuits connected, the current flow in the several arms is:

$$I_a = I_b = \frac{I_e}{2} + \frac{I_i}{2} \qquad (1)$$

$$I_c = I_d = \frac{I_e}{2} - \frac{I_i}{2} \qquad (2)$$

The temperature to which the thermal junctions will rise is proportional to the square of the currents and the temperatures at thermocouples $a$ and $b$ will be:

$$T_a = T_b = K\left[\frac{I_e^2}{4} + \frac{I_e I_i}{2} + \frac{I_i^2}{4}\right] \qquad (3)$$

while the temperature of thermocouples $c$ and $d$ will be:

$$T_c = T_d = K\left[\frac{I_e^2}{4} - \frac{I_e I_i}{2} + \frac{I_i^2}{4}\right] \qquad (4)$$

where K is a constant.

These temperatures develop direct current voltages that impress upon the instrument 11 or the resistance 11a a resultant millivoltage that is a function of the difference between Equations 3 and 4, i. e. of the product $I_e I_i$.

Phase angle has not been considered in the above explanation but a factor, $\cos \theta$, can be applied to either of the current terms and will be found to apply to the final result, so that the millivolts produced are proportional to $I_e I_i \cos \theta$.

Figure 2:
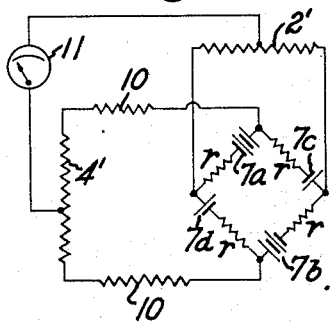
Figs. 2 and 3 are equivalent diagrams of the direct current circuit of the wattmeter.
Figure 3:
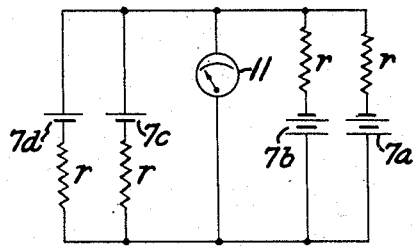

The fact that the voltage impressed on the instrument 11 is one-half the difference between the millivoltages developed in bridge arms $a$, $b$ and $c$, $d$ can be developed mathematically but may be demonstrated by the equivalent circuits of Figs. 2 and 3. By inspection, it can be seen that the connections of the instrument circuit to the transformer windings do not introduce an alternating current into the measuring circuit since the center taps are continuously at the same alternating current potential.

In the direct current circuit, the transformers act simply as resistances and are represented by resistors 2' and 4', and the thermal generators are represented as batteries $7a$—$7d$, each in series with a resistance $r$. The polarity of the batteries, as indicated in Fig. 2, is identical with the polarity of the corresponding thermocouples, i. e. continuous around the bridge. The resistances 2', 4' and 10 external to the bridge arms are effective only in the instrument circuit, and except for affecting instrument sensitivity, may be ignored. The equivalent circuit thus reduces to the simple form shown in Fig. 3. The pair of batteries $7a$, $7b$, in parallel, feeds into a second pair of batteries $7c$, $7d$, in parallel, and the instrument 11 reads one-half the difference by virtue of being connected across the pairs.

The heating currents pass directly through the thermocouples and, for a quick response to changing energy consumption, the thermocouples are preferably of small mass. This gives rise to the possibility of destruction on overloads and the core 5 of the current transformer is therefore designed to saturate completely on a predetermined overload. Saturation of the core at somewhat less than three times the normal line current will restrict the current through the thermocouples to values that preclude damage at abnormal overloads. Thermocouples of noble metals may readily be designed for adequate millivoltage output for normal operation at 200° C. and to withstand 100% overload when the temperature rises to say, 800° C. Thermocouples of noble metals do not oxidize and do not change in characteristics when heated to temperatures close to their melting points. It is therefore possible to construct a quick acting, direct reading wattmeter that will not be destroyed by an overload on the line.

The resistors 10 are included in the potential circuit for adjustment, if necessary in view of the individual transformer design, to make the potential transformer output current $I_e$ equal to the current component $I_i$ at maximum overload. This condition results in a minimum percentage rise, above the normal current consumption in the summation arms of the bridge, at the maximum overload point.

Figure 4:
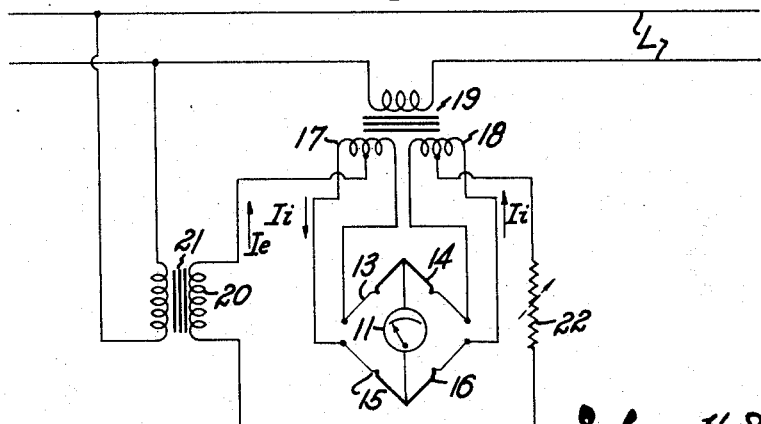
Figs. 4 and 5 are circuit diagrams of other embodiments of single phase wattmeters.

A more efficient use of the developed temperatures and corresponding millivoltage outputs is obtained with the circuit shown in Fig. 4. The direct current instrument 11 is connected between the common terminals constituting the junctions of like elements of two pairs of oppositely arranged thermocouples 13, 14 and 15, 16, and the separate secondary windings 17, 18 of the current transformer 19 are connected in series, but in alternation, with the pairs of thermocouples to form a bridge-like closed circuit. The windings 17, 18 have center taps across which the secondary of the potential transformer 21 is connected through an adjustable resistor 22. The potential circuit is thus connected to points of the same alternating current potential and, except for the incidental resistance which is relatively low, the current inputs to the thermocouples from either the current or the potential circuit are not affected by the presence of the other circuit. The independent sections 17, 18 of the current transformer feed into opposite ends of the thermocouple branches and the symmetrical connection of the instrument to the thermocouple paths therefore prevents the development of an alternating current potential across the instrument 11.

Inspection of the circuit shows that, for transformer output current flow in the directions indicated by the arrows $I_e$ and $I_i$, there will be a summation of current components in thermocouples 15 and 16, and a subtraction of current components in thermocouples 13 and 14. The method of operation is substantially as described in connection with Fig. 1.

Figure 5:
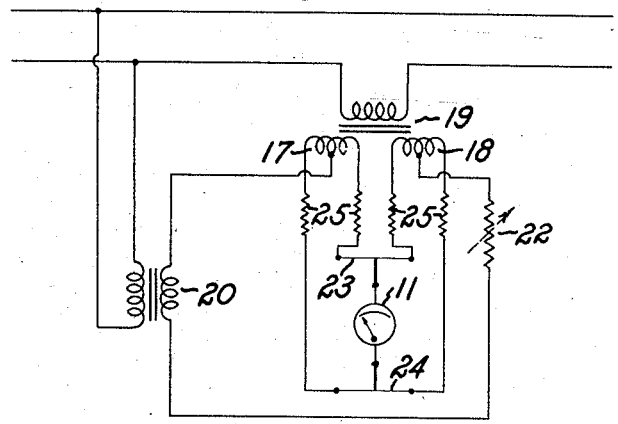

The polarity of the thermocouples is not continuous in the Fig. 4 circuit and this permits of a further simplification of the circuit, as shown in Fig. 5. Thermocouples 23, 24 of T-design are here substituted for the pairs 13, 14 and 15, 16, respectively, of the Fig. 4 circuit, and the current utilization means, i. e., the instrument 11, is connected between the stems of the T-shaped thermocouples. Small resistors 25 may be included in one or more of the bridge circuit arms to obtain a truly conjugate condition when the thermocouples are slightly unbalanced and high accuracy is desired. The substantially uniform characteristics obtained in the normal manufacture of the thermocouples will usually provide a sufficiently accurate balance, but balancing resistors may be employed in this and the other bridge networks when a more exact balance is required. The remaining circuit elements of Fig. 5 are the same as shown in Fig. 4 and are identified by the corresponding reference numerals.

Figure 6:
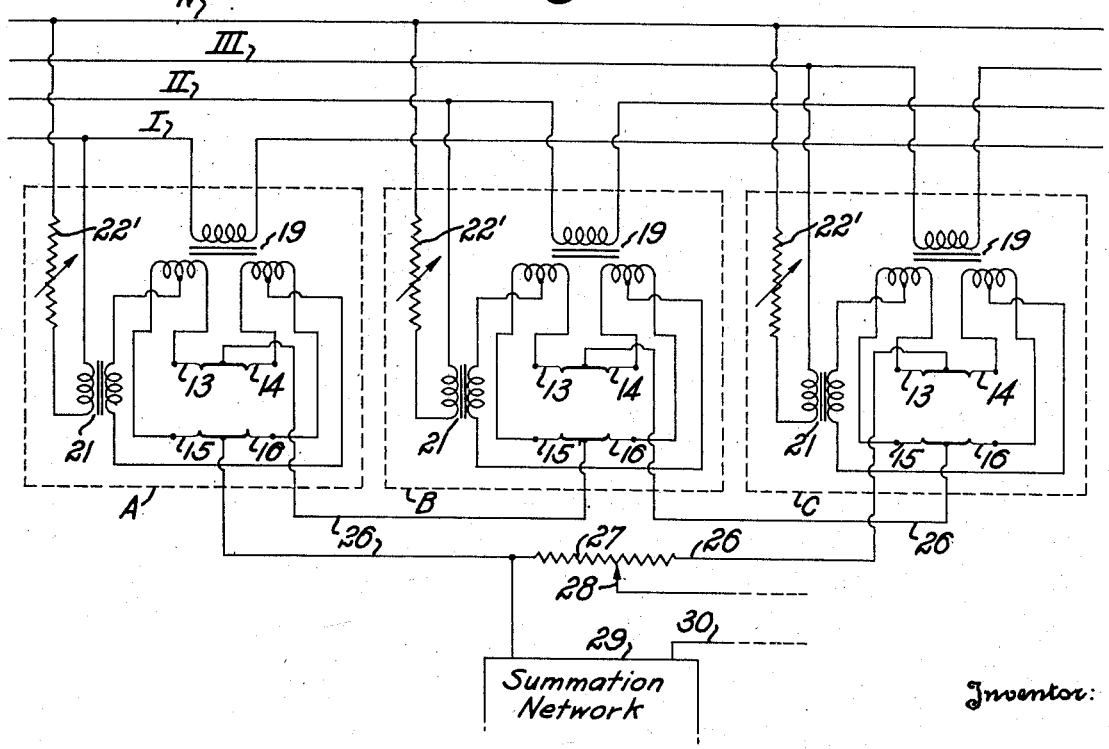
Fig. 6 is a circuit diagram of a multiple phase wattmeter.

An arrangement for measuring the power of a multiphase line, i. e. the summation of the wattage of the several phases of a three phase, four wire system, is shown in Fig. 6. The thermal converter circuits within each of the dotted line rectangles A, B and C are substantially identical with the Fig. 4 circuit and the circuit elements are identified by the same reference numerals. The adjusting resistances 22' of the potential circuits are here shown in the primary circuits. This is the electrical equivalent of the Fig. 4 circuit in which the resistors are in the secondary circuits and has the advantage that higher resistance values, approximating conventional instrument resistances, may be used. The primary windings of the several current transformers are in series in the lines I, II and III, respectively, and the potential transformers are all returned to the neutral wire N. The direct current circuit extends through the three thermal converter circuits in series, being formed by leads 26 from the junction of the thermocouples 13, 14 of one phase to the junction of the thermocouples 15, 16 of the next phase.

The direct current utilization element is shown as a resistance 27 having an adjustable tap 28 for determining that fraction of the total generated millivoltage that may be applied to an instrument or to the potentiometer, not shown, of a summation network 29. The resistance 27 must have some definite total value for which the thermal converter or converters are calibrated and, by standardizing all converter circuits at some one output resistance, for example 100 ohms, the converter circuit may be worked into various instruments, control or summation circuits by an appropriate tapping of the direct current output resistance. The tapped connection is useful when, as indicated in Fig. 6, the power output of the illustrated three phase system is to be totalized with the power output of other power houses that may be located many miles away and even operating on other frequencies. The output resistances 27, or the appropriate fraction thereof, of the converter networks of the several power houses will be included in a series circuit connected between the tap 28 and the lead 30 of the summation network 29. Differences in the transformer ratios at the converter circuits of the several power houses may require different adjustments of the resistance taps 28 at the several thermal converter circuits in order that all of the millivoltage components in the composite system represent the same function of the input power.

The several thermal converter circuits are each completely isolated from the associated power lines by the instrument transformers and it is therefore possible to measure the summation, or the difference if desired, of the wattage of any number of circuits or groups of circuits. The plurality of circuits may be the several phases of a multiphase power system or may be independent circuits working out of the same or different single or multiphase power lines.

The saturated core type of current transformer may be used for protection of the thermocouples in any of the described measuring circuits.

It is to be understood that the embodiments herein shown and described are typical of the invention and that equivalent circuits which may be designed by those skilled in the art fall within the spirit of my invention as set forth in the following claims.

I claim:

1. A thermal converter circuit for producing a direct current voltage proportional to the product of two current inputs; said circuit comprising a plurality of thermocouples conductively connected in the balancing arms of a direct current Wheatstone bridge network, an input circuit connected to said network to establish a current flow therein, a second input circuit connected to said network at spaced points therein between which the potential established by the first input circuit is zero, and a direct current output circuit conductively connected to said network at spaced points between which zero potential difference is established by said input circuits and between which a direct current potential is established by said thermocouples upon a current input into said network from both input circuits.

2. A thermal converter circuit as claimed in claim 1, wherein said direct current output circuit includes a measuring instrument.

3. A thermal converter for producing a direct current voltage output proportional to the product of current from two alternating current input circuits; said thermal converter comprising a plurality of thermocouples in the balancing side arms of a direct current Wheatstone bridge network, a direct current circuit connected to said network and including a current utilization element, and two alternating current input circuits conductively connected to said bridge network as the conjugate arms thereof.

4. A thermal converter as claimed in claim 3, in combination with adjustable resistance means in one of said input circuits to vary the relative magnitudes of the current inputs from the respective input circuits.

5. A thermal converter as claimed in claim 3, wherein one of said input circuits includes a transformer having a secondary winding conductively connected to said bridge network, a primary winding, and an adjustable resistance connected to one of said windings to vary the current flow in the secondary winding.

6. A thermal converter as claimed in claim 3, wherein one of said input circuits includes a transformer having a secondary winding conductively connected to said bridge network, a primary winding, and an adjustable resistance connected to the primary winding to vary the current flow in the secondary winding.

7. A thermal converter as claimed in claim 3, wherein one of said input circuits includes a transformer having a secondary winding conductively connected to said bridge network, a primary winding, and an adjustable resistance connected to the secondary winding to vary the current flow therein.

8. A bridge-form electrical network comprising bridge arms including a plurality of thermocouples, two alternating current input circuits conductively connected to the bridge arms and conjugate to each other, and a direct current circuit conductively connected to spaced points of the network between which there is zero alternating current potential and a direct current potential upon a current input into said network from both input circuits.

9. An electrical network comprising a plurality of thermal converter circuits each including a pair of alternating current input circuits in conjugate relation and conductively connected to a plurality of thermocouples, a direct current circuit conductively connected through said thermal converter circuits in series and at points in each thermal converter circuit between which there is zero alternating current potential, and a current utilization element in said direct current circuit.

10. An electrical network as claimed in claim 9, wherein said current utilization element comprises a tapped resistance.

11. In a thermal wattmeter, a bridge network having at least two thermocouples in the side arms thereof, a pair of alternating current circuits in which the current flow is proportional respectively to line current and line potential, means conductively connecting said circuits to said bridge network in conjugate relation to establish a summation current flow in one thermocouple and a difference current flow in the other, and a millivoltmeter connected to said thermocouples at spaced points in said network between which there is zero alternating current potential.

12. In a thermal converter, four thermocouples welded together in series in closed circuit to form the four arms of a bridge, the polarity of the thermocouples being continuous around the bridge, means including a center-tapped impedance element connected across one pair of opposite junctions of the bridge to introduce therein a current component proportional to line current, and means including a center-tapped impedance element connected across the other pair of opposite junctions of the bridge for introducing therein a current component proportional to line potential, the center-taps of said impedances constituting terminals between which is developed a direct current potential proportional to the product of said current components.

13. In a thermal converter, a balanced bridge network comprising two center-tapped windings and two sets of thermocouples connected in alternation in a closed direct-current circuit, the sets of thermocouples having like elements similarly positioned with respect to said windings and constituting a set of network terminals, an alternating current source inductively coupled to said windings to establish a current flow in said network, an alternating-current input circuit connected between the center taps of said windings, and a direct-current utilization circuit connected between said like elements of the sets of thermocouples.

14. In a thermal converter, the invention as claimed in claim 13, in combination with a network-balancing resistance in series in said closed direct-current circuit.

15. In a thermal converter, two pairs of oppositely arranged thermocouples, the common terminal of each of said pairs constituting the junction of like elements of said thermocouples, a direct current circuit connected between the common terminals of the respective pairs of thermocouples, a transformer having a pair of center-tapped secondary windings, said windings being connected in series with and arranged in alternation between said thermocouple pairs, and a second transformer having a secondary winding connected between the center-taps of the secondary windings of the first transformer.

16. In a thermal converter circuit for developing an output voltage proportional to the product of two current components, a pair of similar T-type thermocouples, a direct current circuit connected between the stems of said thermocouples, and a pair of conjugately arranged input circuits for establishing a flow of one current component in series through said thermocouples and a flow of the other current component in parallel through said thermocouples.

17. In a thermal converter circuit, a pair of similar T-type thermocouples, a direct current circuit connected between the stems of the thermocouples, a transformer having a pair of center-tapped secondary windings, said windings being connected in series with and arranged in alternation between said thermocouples, and a second transformer having a secondary winding connected between the taps of the secondary windings of the first transformer.

18. In a power summation system, a plurality of thermal converter circuits each including two thermocouple units and means for establishing through the respective units alternating current flows proportional to the sum and to the difference respectively of current components proportional to line current and line potential, and a direct current circuit connected in series through said thermal converter circuits at points in each converter circuit having the same alternating current potential, said direct current circuit including a resistance across which is developed a direct current potential proportional to the summation of the products of the current components of the several converter circuits.

19. In a thermal converter, a direct current circuit including a plurality of thermocouples and a current utilization element, means for establishing through different thermocouples current flows proportional respectively to the sum and the difference of current components proportional to line current and to line potential, and means for limiting the magnitude of the line current component to a predetermined value in excess of its normal maximum value.

20. The invention as claimed in claim 19, wherein the means for establishing current flow includes a current transformer, and said last means is the saturating core of said transformer.

JOHN H. MILLER.